(12) United States Patent
Choi

(10) Patent No.: US 8,149,940 B2
(45) Date of Patent: Apr. 3, 2012

(54) DIGITAL TELEVISION TRANSMITTER/RECEIVER AND METHOD OF PROCESSING DATA IN DIGITAL TELEVISION TRANSMITTER/RECEIVER

(75) Inventor: In Hwan Choi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 263 days.

(21) Appl. No.: 12/606,128

(22) Filed: Oct. 26, 2009

(65) Prior Publication Data

US 2010/0091838 A1 Apr. 15, 2010

Related U.S. Application Data

(63) Continuation of application No. 11/428,309, filed on Jun. 30, 2006, now Pat. No. 7,620,118.

(30) Foreign Application Priority Data

Oct. 6, 2005 (KR) .................. 10-2005-0094074

(51) Int. Cl.
*H04L 5/12* (2006.01)
(52) U.S. Cl. ........................................ 375/265
(58) Field of Classification Search .................. 375/265, 375/240.01, 262; 714/755, 784; 725/43, 725/148

See application file for complete search history.

(56) References Cited

U.S. PATENT DOCUMENTS

| | | | |
|---|---|---|---|
| 6,760,077 B2 | 7/2004 | Choi et al. | |
| 2005/0058160 A1* | 3/2005 | Lee | ................ 370/512 |
| 2006/0253890 A9 | 11/2006 | Park et al. | |
| 2007/0081605 A1 | 4/2007 | Choi et al. | |
| 2007/0230607 A1 | 10/2007 | Yu et al. | |

FOREIGN PATENT DOCUMENTS

| | | |
|---|---|---|
| JP | 10322228 | 12/1998 |
| KR | 1020020094427 | 12/2002 |
| KR | 10-2003-0026236 | 3/2003 |
| MX | 03005163 | 9/2003 |
| MX | 04002568 | 12/2004 |
| WO | 03/003747 | 1/2003 |

OTHER PUBLICATIONS

ATSC "ATSC Standard: Digital Television Standard (A/53), Revision D, Including Amendment No. 1", Doc. A/53D, Jul. 19, 2005.

* cited by examiner

*Primary Examiner* — Khai Tran
(74) *Attorney, Agent, or Firm* — Lee, Hong, Degerman, Kang & Waimey

(57) ABSTRACT

A digital television (DTV) transmitter and a method of coding data in the DTV transmitter are disclosed. A data formatter generates an enhanced data packet including the enhanced data and a known data sequence. A data randomizer randomizes the enhanced data packet. A RS encoder RS-codes the randomized data packet by adding first parity data, and a data interleaver interleaves the RS-coded data packet. A trellis encoding unit trellis-encodes the interleaved data packet. Herein the trellis encoding unit includes a TCM encoder for generating a first output bit by trellis-encoding a first input bit and generating a second output bit by bypassing the first input bit, and a pre-coder for generating a third output bit by precoding a second input bit, wherein memories included in the TCM encoder and the pre-coder are initialized when the known data sequence is inputted to the trellis encoding unit.

16 Claims, 12 Drawing Sheets

DIGITAL TELEVISION TRANSMITTER/RECEIVER AND METHOD OF PROCESSING DATA IN DIGITAL TELEVISION TRANSMITTER/RECEIVER

This application is a continuation of U.S. application Ser. No. 11/428,309, filed Jun. 30, 2006, now U.S. Pat. No. 7,620, 118, which pursuant to 35 U.S.C. §119(a), claims the benefit of the Korean Patent Application No. 10-2005-0094074, filed on Oct. 6, 2005, which are hereby incorporated by reference as if fully set forth herein.

BACKGROUND OF THE INVENTION

1. Field of the Invention

The present invention relates to a digital telecommunications system, and more particularly, to a digital television (DTV) transmitter/receiver and a method of coding data in the DTV transmitter/receiver. Although the present invention is suitable for a wide scope of applications, it is particularly suitable for modulating a digital television signal to a vestigial side band (VSB) mode and transmitting and receiving the VSB modulated digital television signal.

2. Discussion of the Related Art

Since the second half of 1998, the United States of America has adopted an advanced television systems committee (ATSC) 8T-VSB transmission method as the 1995 standard for broadcasting. Presently, the Republic of Korea is also providing broadcast programs by adopting the ATSC 8T-VSB transmission method as the standard for broadcasting. Accordingly, experimental broadcasting began in May 1995, and a test-broadcasting system began on Aug. 31, 2000.

FIG. 1 illustrates a conventional ATSC 8T-VSB transmitting system. A data randomizer randomizes MPEG video/audio data that are inputted. A Reed-Solomon encoder Reed-Solomon encodes data so as to add a 20-byte parity code. A data interleaver interleaves the data. A trellis encoder converts the data from bytes to symbols and, then, trellis-encodes the converted data. A multiplexer (MUX) multiplexes a symbol column and synchronization signals, and a pilot inserter adds a pilot signal to the symbol column. A VSB modulator converts the symbol column to an 8VSB signal of an intermediate frequency bandwidth. And, a RF converter converts the VSB-converted signal to an RF bandwidth signal and transmits the RF bandwidth-converted signal to an antenna.

The 8T-VSB transmission mode, which is adopted as the standard for digital broadcasting in North America and the Republic of Korea, is a system that has been developed for the transmission of MPEG video/audio data. However, presently, the technology for processing digital signals is being developed at a vast rate, and, as a larger number of the population uses the Internet, digital electric appliances, computers, and the Internet are being integrated. Therefore, in order to meet with the various requirements of the users, a system that can add video/audio data through a digital television channel so as to transmit diverse additional information needs to be developed.

Some users may assume that additional data broadcasting would be applied by using a PC card or a portable device having a simple in-door antenna attached thereto. However, when used indoors, the intensity of the signals may decrease due to a blockage caused by the walls or disturbance caused by approaching or proximate mobile objects. Accordingly, the quality of the received digital signals may be deteriorated due to a ghost effect and noise caused by reflected waves. However, unlike the general video/audio data, when transmitting the additional data, the data that is to be transmitted should have a low error ratio. More specifically, in case of the video/audio data, errors that are not perceived or acknowledged through the eyes or ears of the user can be ignored, since they do not cause any or much trouble. Conversely, in case of the additional data (e.g., program execution file, stock information, etc.), an error even in a single bit may cause a serious problem. Therefore, a system highly resistant to ghost effects and noise is required to be developed.

The additional data are generally transmitted by a time-division method through the same channel as the MPEG video/audio data. However, with the advent of digital broadcasting, ATSC VSB digital television receivers that receive only MPEG video/audio data are already supplied to the market. Therefore, the additional data that are transmitted through the same channel as the MPEG video/audio data should not influence the conventional ATSC VSB receivers that are provided in the market. In other words, this may be defined as ATSC VSB compatibility, and the additional data broadcast system should be compatible with the ATSC VSB system. Herein, the additional data may also be referred to as enhanced data or E-VSB data. Furthermore, in a poor channel environment, the receiving quality of the conventional ATSC VSB receiving system may be deteriorated. More specifically, resistance to changes in channels and noise is more highly required when using portable and/or mobile receivers.

SUMMARY OF THE INVENTION

Accordingly, the present invention is directed to a digital television (DTV) transmitter and a method of coding data in the DTV transmitter that substantially obviate one or more problems due to limitations and disadvantages of the related art.

An object of the present invention is to provide a digital television system that is suitable for transmitting additional data and that is highly resistant to noise.

Another object of the present invention is to provide a digital television system that can enhance a decoding performance of an additional data symbol.

A further object of the present invention is to provide a digital television (DTV) transmitter and a method of coding data in the DTV transmitter that can insert known data in a specific area of the additional data and transmitting the data to a transmitter/receiver, thereby enhancing the reception performance of the digital television system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital television (DTV) transmitter for coding enhanced data for transmission includes a data formatter for generating an enhanced data packet including the enhanced data and a known data sequence, a data randomizer for randomizing the enhanced data packet, a Reed-Solomon (RS) encoder for RS-coding the randomized data packet by adding first parity data, a data interleaver for interleaving the RS-coded data packet, and a trellis encoding unit for trellis-encoding the interleaved data packet, wherein the trellis encoding unit may include a trellis-coded modulation (TCM) encoder for generating a first output bit by trellis-encoding a first input bit and generating a second output bit by bypassing the first input bit, and a pre-coder for generating a third output bit by pre-coding a second input bit, wherein memories included in the TCM encoder and the pre-coder are initialized when the known data sequence is inputted to the trellis encoding unit.

The trellis encoding unit may further include an initialization controller for generating initialization data bits required to initialize the memories of the TCM encoder and the pre-coder, and a multiplexer for replacing a portion of the known data sequence with the initialization data bits, wherein an output of the multiplexer is inputted to the TCM encoder and the pre-coder. And, the DTV transmitter may further include a backward-compatibility processor which generates second parity data based on the RS-coded data packet in which the portion of the known data sequence is replaced with the initialization data bits to reflect the replacement made by the multiplexer. Herein, the multiplexer further may replace the first parity data included in the interleaved data packet with the second parity data.

In another aspect of the present invention, a method of coding enhanced data for transmission in a digital television (DTV) transmitter includes generating an enhanced data packet including the enhanced data and a known data sequence, randomizing the enhanced data packet, Reed-Solomon (RS)-coding the randomized data packet by adding first parity data, interleaving the RS-coded data packet, and trellis-encoding the interleaved data packet using a trellis encoding unit which includes a trellis-coded modulation (TCM) encoder and a pre-coder, wherein trellis-encoding the interleaved data packet may include generating a first output bit by trellis-encoding a first input bit and generating a second output bit by bypassing the first input bit in the TCM encoder, generating a third output bit by pre-coding a second input bit in the pre-coder, and initializing memories included in the TCM encoder and the pre-coder when the known data sequence is inputted to the trellis encoding unit.

Herein, initializing memories included in the TCM and the pre-coder may include generating initialization data bits required to initialize the memories of the TCM encoder and the pre-coder, replacing a portion of the known data sequence with the initialization data bits, and inputting the known data sequence including the initialization data bits to the TCM encoder and the pre-coder. The trellis-encoding the interleaved data packet may further include generating second parity data based on the RS-coded data packet in which the portion of the known data sequence is replaced with the initialization data bits. The trellis-encoding the interleaved data packet may further include replacing the first parity data included in the interleaved data packet with the second parity data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In the present invention, the enhanced data may either consist of data including information such as program execution files, stock information, and so on, or consist of video/audio data. Additionally, the known data refer to data already known based upon a pre-determined agreement between the transmitter and the receiver. Furthermore, the main data consist of data that can be received from the conventional receiving system, wherein the main data include video/audio data.

Figure 2:
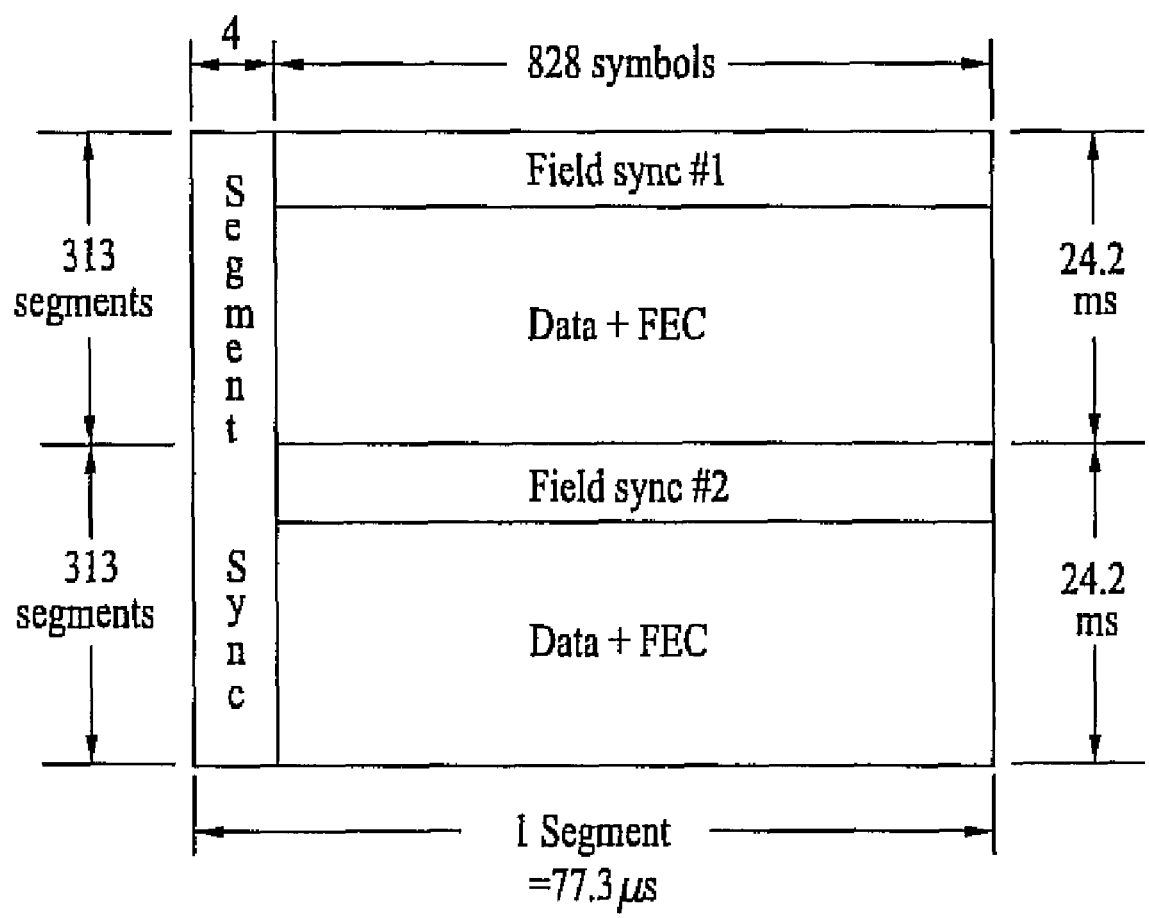
FIG. 2 illustrates a structure of a general VSB transmission frame.

FIG. 2 illustrates a structure of a general VSB transmission frame. Herein, one frame is configured of two fields. Each field includes one field synchronization segment and 312 data segments. The present invention relates to inserting known data in a predefined position within the data segment and transmitting the data, thereby enhancing the receiving performance of the digital television receiver.

Figure 3:
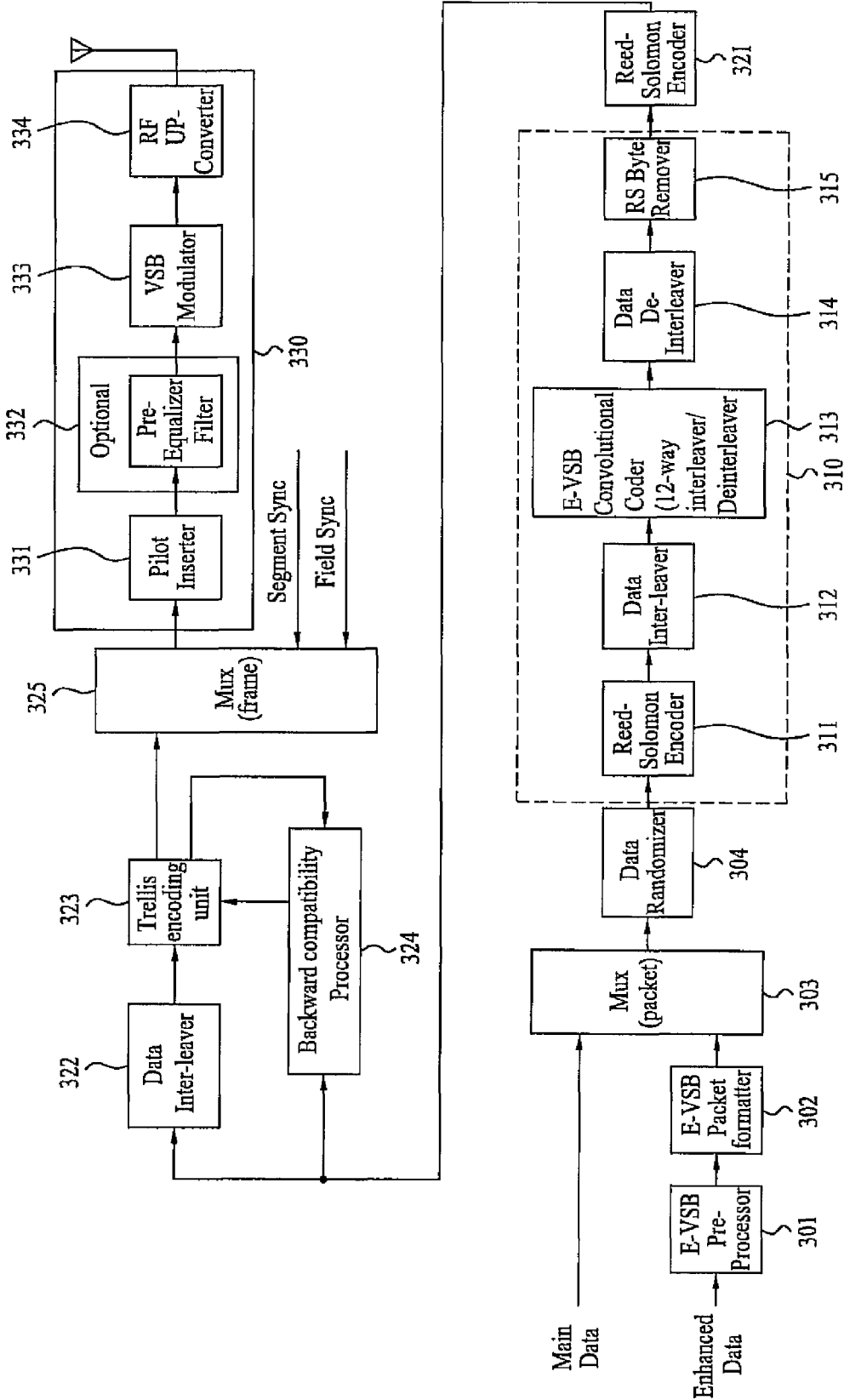
FIG. 3 illustrates an overall block view of a digital television transmitter according to the present invention.

FIG. 3 illustrates an overall block view of a digital television (DTV) transmitter according to the present invention. The DTV transmitter includes an E-VSB pre-processor 301, an E-VSB packet formatter 302, a packet multiplexer 303, a data randomizer 304, an E-VSB post-processor 310, a Reed-Solomon (RS) encoder 321, a data interleaver 322, a trellis encoding unit 323, a backward-compatibility processor 324, a frame multiplexer 325, and a transmitter 330. In the present invention having the above-described structure, main data are outputted to the packet multiplexer 303 in transport packet units, and enhanced data are outputted to the E-VSB pre-processor 301. The E-VSB pre-processor 301 pre-processes the enhanced data, such as encoding additional error correction and inserting null data bits, and then outputs the pre-processed enhanced MPEG stream to the E-VSB packet formatter 302.

The E-VSB packet formatter 302 aligns the pre-processed data and the pre-defined known data on a specific position of the packet in accordance with a set rule. Thereafter, the E-VSB packet formatter 302 outputs the aligned data to the packet multiplexer 303 in even packet units. The detailed operation of the E-VSB packet formatter 302 will be described in a later process. Furthermore, the packet multiplexer 303 multiplexes the enhanced data packet and the main data packet in accordance with a pre-defined multiplexing rule, the enhanced MPEG packet having the known data inserted therein and transmitted from the E-VSB packet formatter 302. Then, the multiplexed data passes through the data randomizer 304 and is outputted to the E-VSB post-processor 310. Herein, the E-VSB post-processor 310 includes a Reed-Solomon (RS) encoder 311, a data interleaver 312, an E-VSB convolutional encoder 313, a data deinterleaver 314, and a RS byte remover 315. The RS encoder 311 RS-codes the data outputted from the data randomizer 304. Thereafter, the RS encoder 311 adds a 20-byte parity data and outputs the data to the data interleaver 312.

Figure 4:
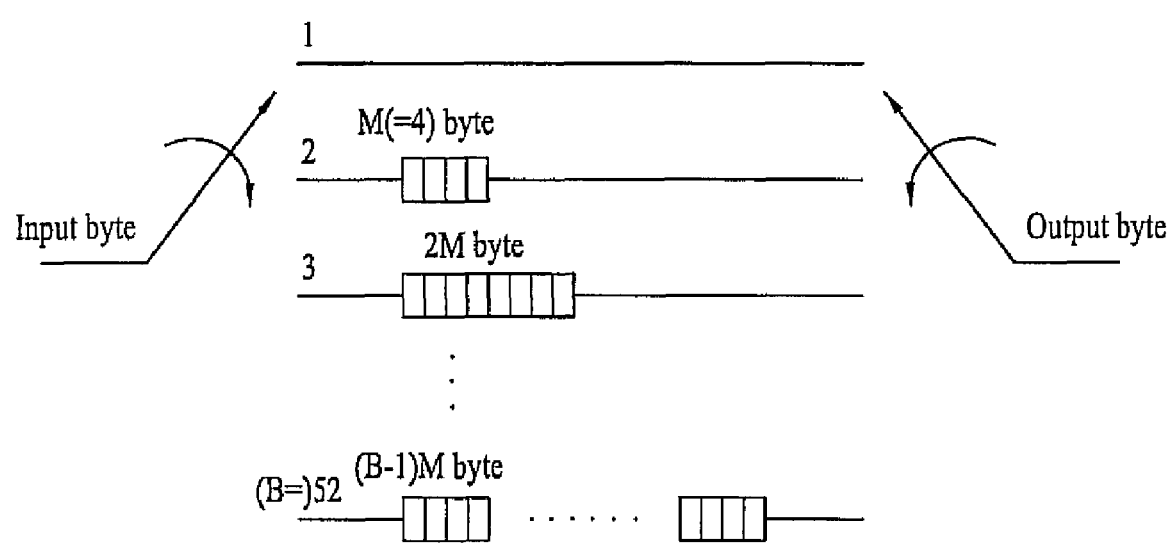
FIG. 4 illustrates a block view of a data interleaver shown in FIG. 3 according to an embodiment of the present invention.

FIG. 4 illustrates a block view of the data interleaver 312, shown in FIG. 3, according to an embodiment of the present invention. In this example, a convolutional interleaver having 52 branches and a unit memory byte number of M=4 is described. In the data interleaver 312, when a first byte is inputted, the inputted first byte is directly outputted through a first branch, and a second byte is inputted through a second branch. Accordingly, a value prior to 52*4 bytes is outputted.

Figure 5:
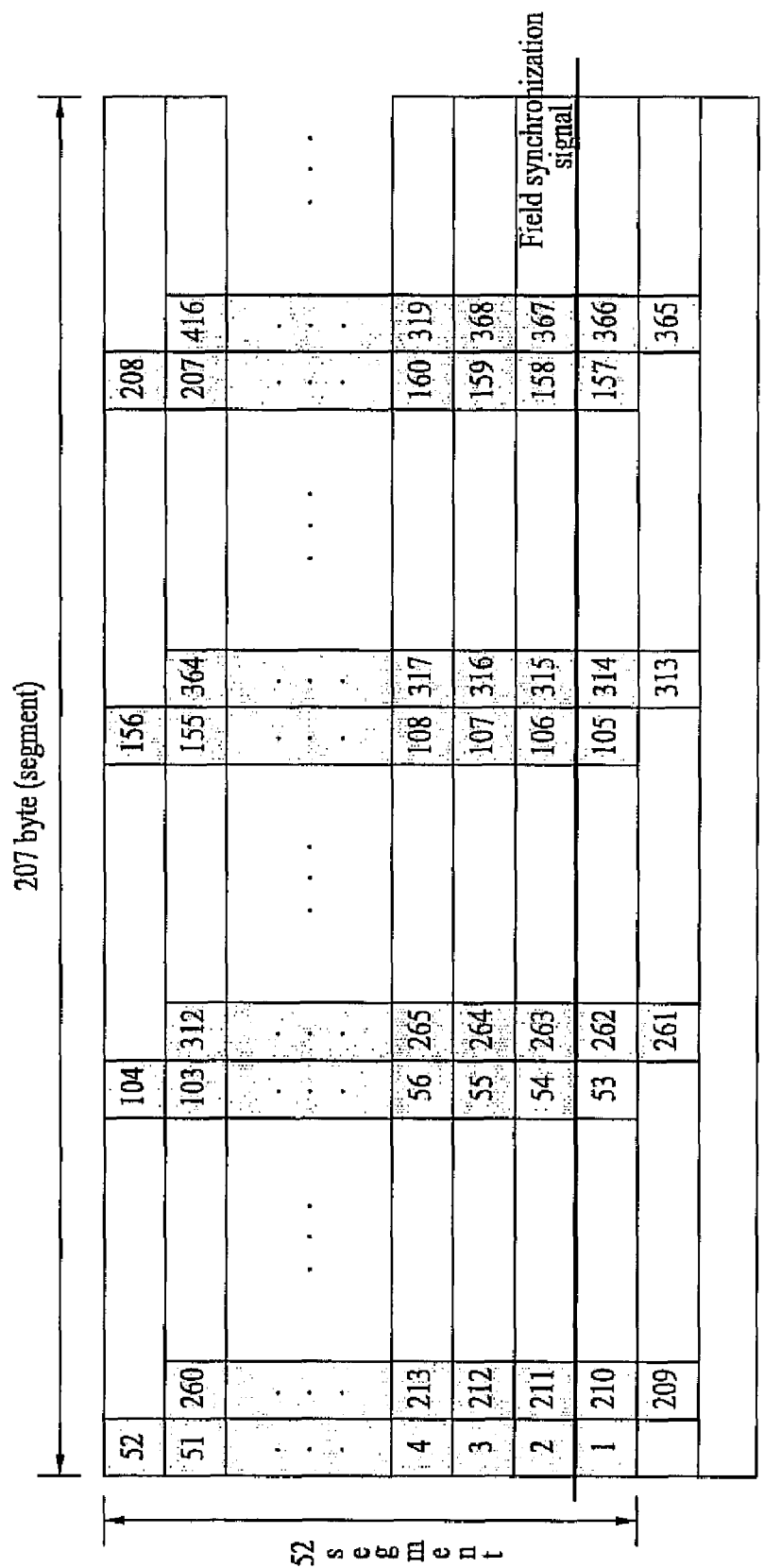
FIG. 5 illustrates an operation example of the data interleaver shown in FIG. 3 on the frame structure according to the present invention.
Figure 6:
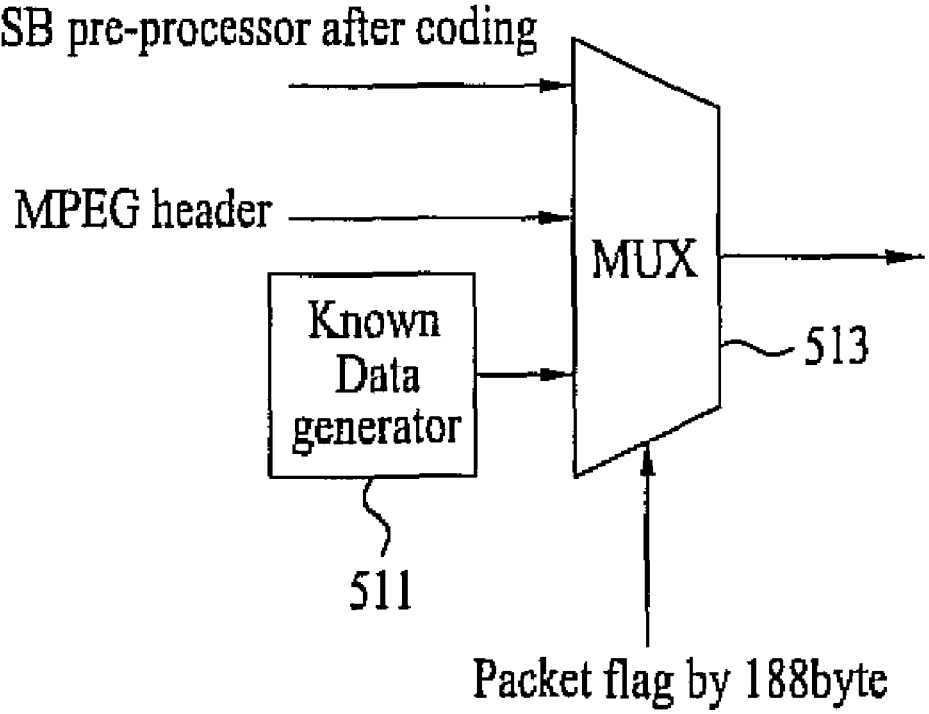
FIG. 6 illustrates a detailed block view of a packet formatter shown in FIG. 3 according to an embodiment of the present invention.

FIG. 5 illustrates an operation example of the data interleaver shown in FIG. 3 on the frame structure according to the present invention. Herein, the data is inputted in segment units from top to bottom, and the byte within the segment is inputted first to the left side and then to the right side. The numbers shown in FIG. 5 indicate the outputted order from the interleaver. The data interleaver 312 is operated in units of 52 segments. The output data of the data interleaver 312 are outputted to the E-VSB convolutional encoder 313, wherein the output data is E-VSB convolutional encoded. Then, the E-VSB convolutional encoded data pass through the data interleaver 314 and are outputted to the RS byte remover 315, thereby removing (or deleting) the 20-byte parity. This is to recalculate the parity since the original data has been modified by the E-VSB convolutional encoder 313.

More specifically, the output of the RS byte remover 315 is inputted to the RS encoder 321 so as to be RS-coded. Then, after the 20-byte parity is added once again, the data is outputted to the data interleaver 322. The operation of the data interleaver 322 can be easily understood by referring to FIG. 3 and FIG. 4. Therefore, a detailed description of the same will be omitted for simplicity.

The output of the data interleaver 322 is inputted to the trellis encoding unit 323. The trellis encoding unit 323 encodes the inputted 2 bits to 3 bits and outputs the encoded data (i.e., 3 bits) to the frame multiplexer 325. In order to make the data outputted from the trellis encoding unit 323 as the known data within the DTV transmitter/receiver, a memory within the trellis encoding unit 323 needs to be initialized with respect to the known data inserted in the enhanced packet. At this point, initialization is performed by a new set of data and not by the input data. Therefore, a new RS parity should be created and be replaced with the initial parity data. More specifically, this operation is performed by the backward-compatibility processor 324. The initialization process of the trellis encoding unit 323 and the operation of the backward-compatibility processor 324 will also be described in detail in a later process.

Figure 1:
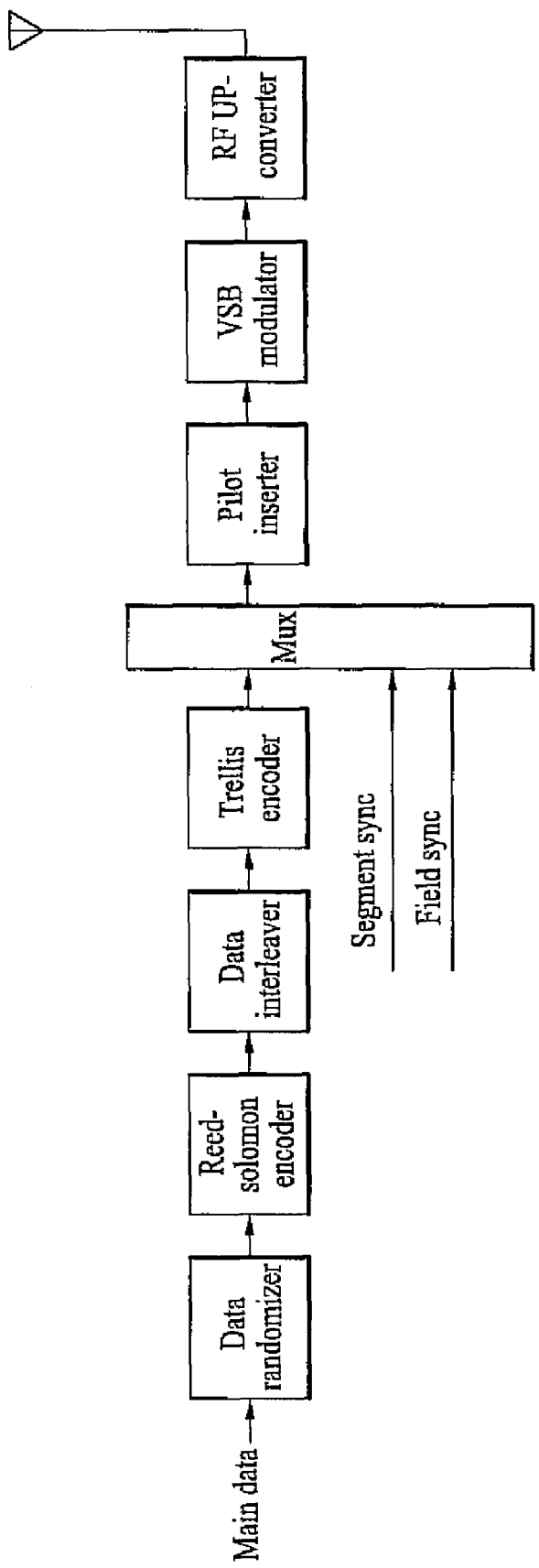
FIG. 1 illustrates a block view of a conventional ATSC 8T-VSB transmitting system.

The output of the trellis encoding unit 323 is inputted to the frame multiplexer 325. Then, the frame multiplexer 325 inserts field and segment synchronization signals to the output data of the trellis encoding unit 323 and outputs the data to the transmitter 330. The transmitter 330 includes a pilot inserter 331, a VSB modulator 333, and a radio frequency (RF) converter 334. Since this structure is similar to the transmitting system of FIG. 1, a detailed description of the same will be omitted for simplicity.

Hereinafter, the operation of the packet formatter 302 will be described in detail. FIG. 5 illustrates a detailed block view of the packet formatter shown in FIG. 3 according to an embodiment of the present invention. The packet formatter 302 includes a known data generator 511 and a multiplexer 513. The known data generator 511 creates the known data, and the multiplexer 513 multiplexes and outputs the data pre-processed by the E-VSB pre-processor 301 and the MPEG header byte. More specifically, the multiplexed and outputted known data are interleaved and trellis-encoded from the transmitting end, thereby being transmitted to the receiving end. In the VSB transmission frame structure of the receiving end, the frame structure being the last step prior to the final transmission, the transmitted known data is used as a separate reference data other than the synchronization data in a channel equalizer and a demodulator. Herein, in the related art receiver, only the synchronization data are used as the reference data. Thus, the receiving performance can be enhanced. Additionally, the output of the packet formatter 302 is outputted in 188-byte units. The first 4 bytes correspond to the MPEG header byte. And, the known data and the output data of the E-VSB pre-processor are multiplexed in the remaining 184 bytes.

Figure 7:
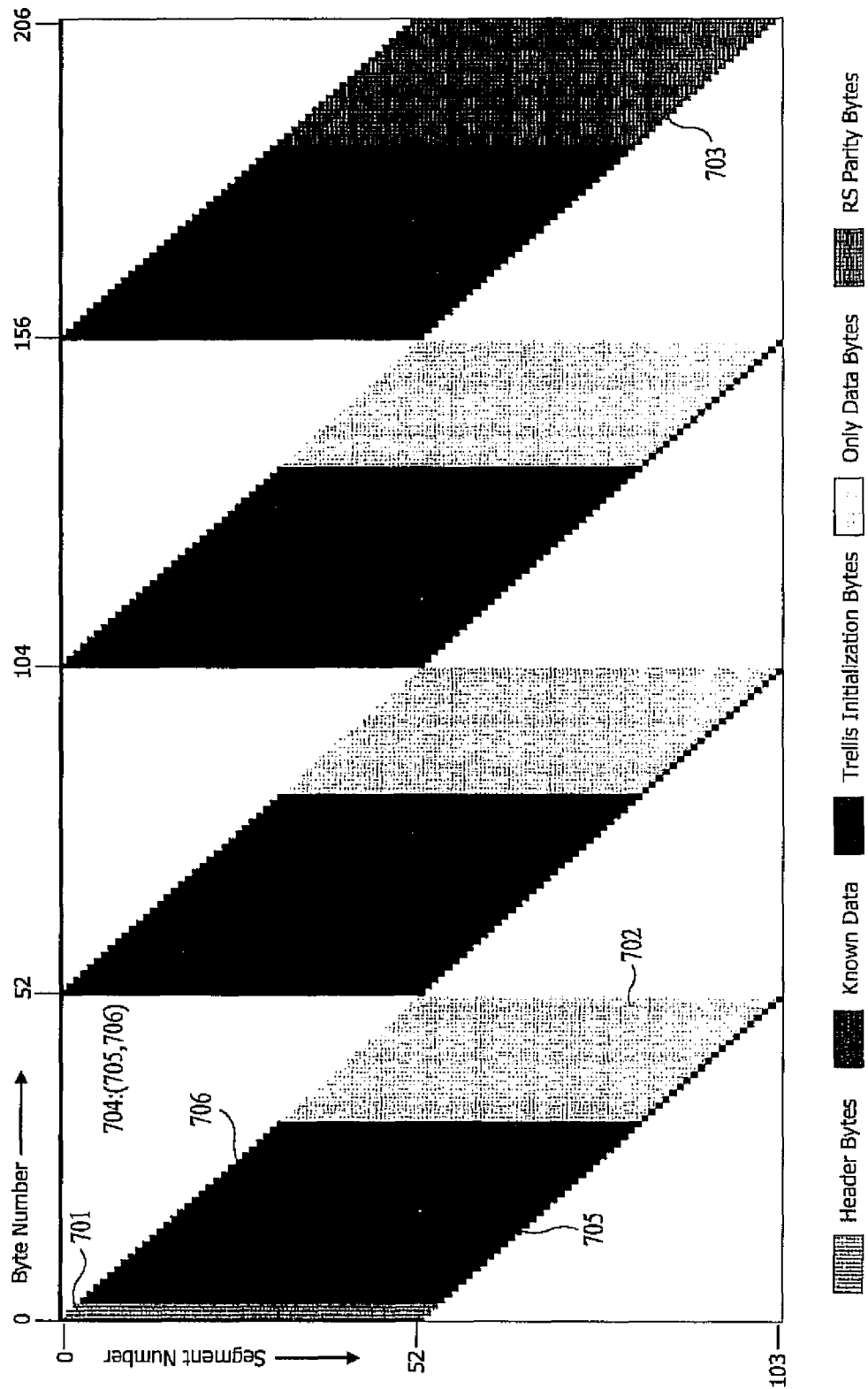
FIG. 7 illustrates a frame structure showing an example of inserting known data prior to interleaving according to the present invention.

FIG. 7 illustrates a frame structure showing an example of inserting known data prior to interleaving according to the present invention. However, this does not correspond to the final frame that is to be transmitted. In other words, FIG. 7 illustrates a portion of the data segments within the frame and, more specifically, illustrates an example of the known data being inserted by the packet formatter 302. For a better understanding and simplicity of the description of the present invention, the frame structure shown in the example of FIG. 7 consists of 52 segments, which corresponds to an interleaving depth.

Referring to FIG. 7, the frame structure broadly consists of 4 data areas. More specifically, the frame structure consists of a header area 701, a payload area 702 in which only the E-VSB data can be present, a parity area 703, and a known data area 704 in which the known data can be present. Herein, the known data area is divided into a first area 705 in which the trellis encoder can be initialized, and a second area 706 in which the trellis encoder cannot be initialized.

The first area 705 in which the trellis encoder can be initialized corresponds to a position of the bytes that are outputted from the data interleaver earlier than the parity bytes of the corresponding segment. At this point, when the inputted data is changed from the enhanced data or main data to the known data, a portion or all of the data in the first area 705 is replaced with an initialization data and inputted to the memory of the trellis encoding unit 323. A portion of all of the first area 705 in which the trellis encoder can be initialized may include the known data and/or the enhanced data.

The second area 706 in which the trellis encoder cannot be initialized may include the known data or the general enhanced data. Herein, the area size of both data types may be adequately modified by the designer of the present invention. In other words, the amount of the known data and that of the enhanced data is relative to one another. Furthermore, the size of the first area 705 and the size of the second area 705 may differ in each segment.

Figure 8:
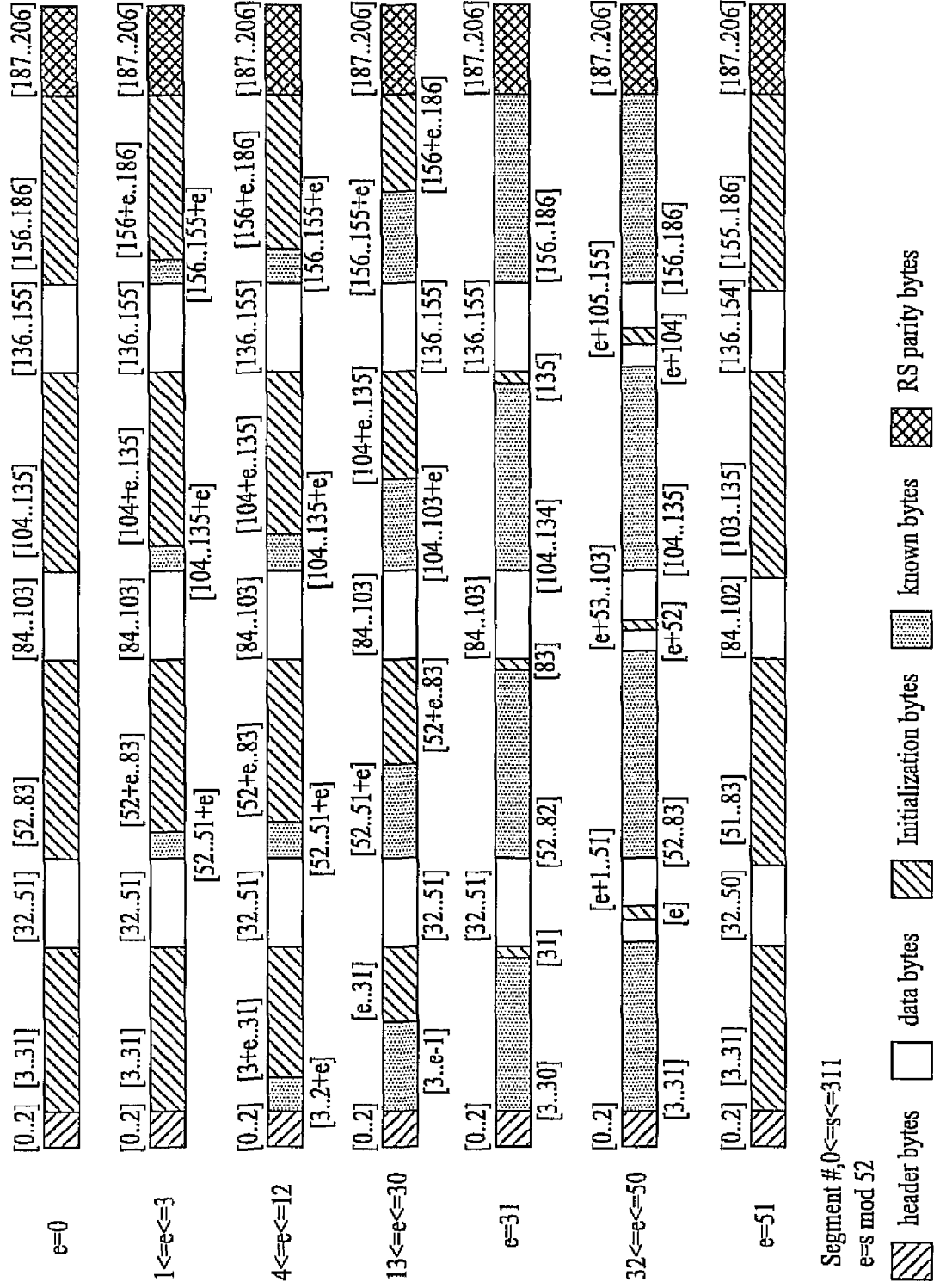
FIG. 8 illustrates the example of inserting known data by describing each corresponding segment.

In the example shown in the preferred embodiment of the present invention, the size of each area differs in accordance with a segment order within a VSB data field. FIG. 8 illustrates the example of inserting known data by describing each corresponding segment. This is to enable, after a data interleaving process, the known data of each segment to be gathered (or grouped) in a specific area. For example, when the interleaving depth of a segment is 52, and when the order (e) of the segment is equal to or higher than 13 and equal to or lower than 30 (i.e., $13 \leq e \leq 30$), the segment sequentially includes a header area, an area in which the trellis encoder cannot be initialized, an area in which the trellis encoder can be initialized, and a payload area. This order is repeated 4 times, and thereafter, a parity area is included.

Figure 9:
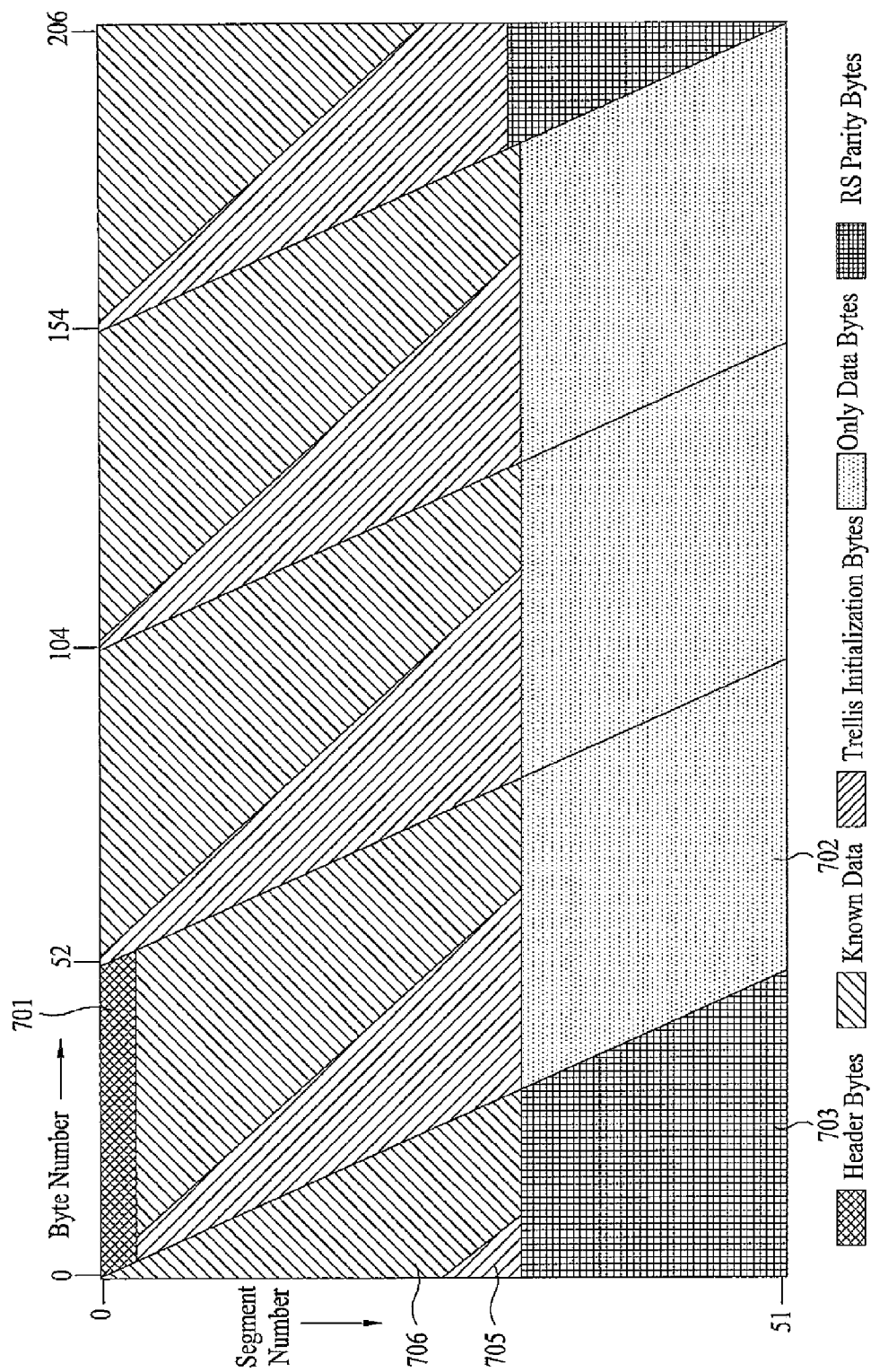
FIG. 9 illustrates a frame structure showing an example of inserting known data after interleaving according to the present invention.

When data is interleaved in the above-described structure by the data interleaver 322, the corresponding frame structure is as shown in FIG. 9. More specifically, FIG. 9 illustrates a frame structure showing an example of inserting known data after interleaving according to the present invention. Referring to FIG. 9, the data of the header areas are first included, and then the data of the known data areas are included. In other words, the known data which were scattered in each segment prior to the data interleaving process are grouped in a plurality of segments after the data interleaving process. The known data areas are followed by data of the parity areas and the data of the payload areas.

Figure 10:
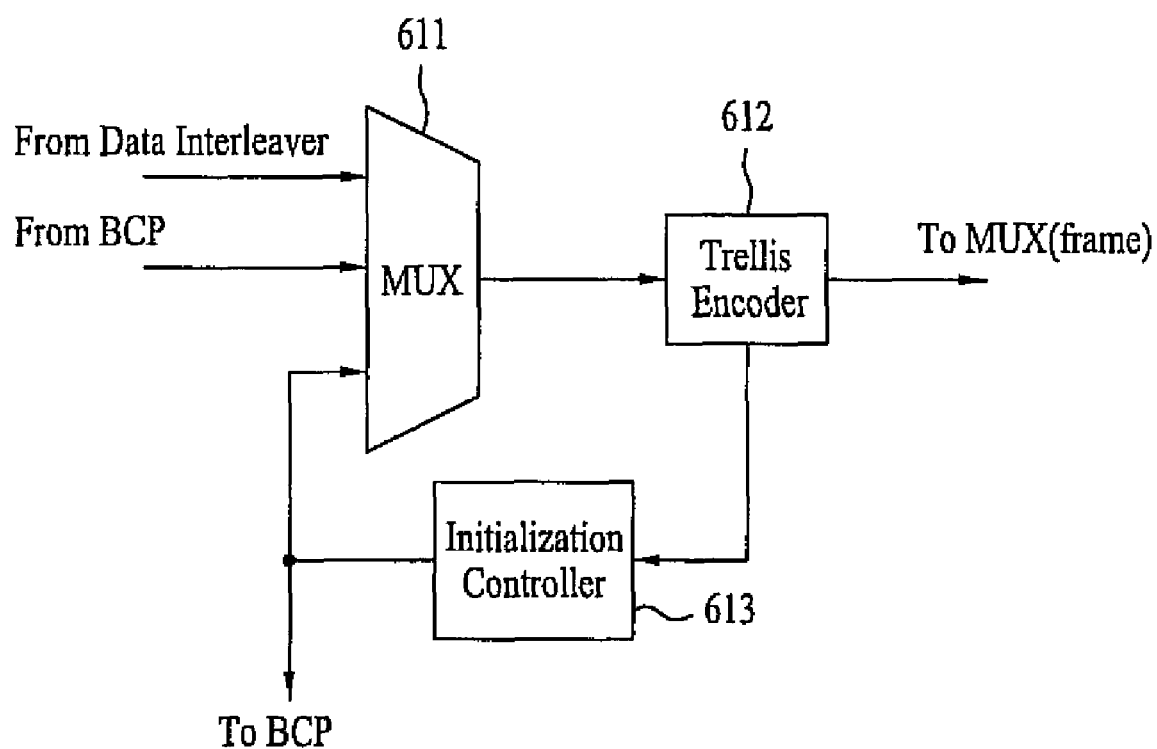
FIG. 10 illustrates a detailed block view of a trellis encoder according to an embodiment of the present invention.

FIG. 10 illustrates a detailed block view of a trellis encoder according to an embodiment of the present invention. More specifically, FIG. 10 is an example of a detailed block view of the trellis encoding unit 323 that can be initialized and that trellis-encodes the data interleaved by the data interleaver as shown in FIG. 9. Referring to FIG. 10, the trellis encoding unit 323 includes a multiplexer 611, a trellis encoder 612, and an initialization controller 613. The multiplexer 611 multiplexes and outputs the interleaved data, the parity bytes outputted from the backward-compatibility processor 324, and the initialization data bits in accordance with a predetermined rule. The initialization controller 613 generates initialization data bits for initializing the memory of the trellis encoder 612, so as to output the generated initialization data bits to the multiplexer 611 and the backward-compatibility processor 324.

More specifically, when the interleaved data are the known data, and the known data are positioned at the beginning of the known data sequence, to which data is consecutively inputted, then initialization of the trellis encoding unit 323 is required. More specifically, when a known data sequence is inputted to the trellis encoder 612 as the input data, various types of output sequences may be obtained depending upon the memory state of the trellis encoder 612. Therefore, by first initializing the trellis encoder 612 to a predetermined value, when the known data sequence begins, and then inputting the known data, the known data output sequence may be obtained from the output of the trellis encoder 612. Accordingly, when the memory of the trellis encoder 612 is required to be initialized, a portion of the known data should be replaced with the initialization data bits and outputted to the trellis encoder 612. Accordingly, the memory of the trellis encoder 612 is initialized by the initialization data bits, and the output of the trellis encoder 612 includes the known data coded with a pattern desired by the DTV transmitter/receiver.

When the interleaved and outputted data are the known data, and when initialization is required, the multiplexer 611 replaces a portion of the interleaved data with the initialization data bits and outputs the data to the trellis encoder 612. Additionally, on the parity position within each enhanced data segment, the multiplexer 611 outputs the parity data outputted from the backward-compatibility processor 324 to the trellis encoder 612. In other instances, the multiplexer 611 outputs the interleaved data to the trellis encoder 612. Thereafter, the trellis encoder 612 trellis-encodes the data outputted from the multiplexer 611 by symbol units. Herein, each symbol consists of 2 bits. For simplicity of the description, among the 2 bits, the upper bit will be referred to as 'd1', and the lower bit will be referred to as 'd0'.

Figure 11:
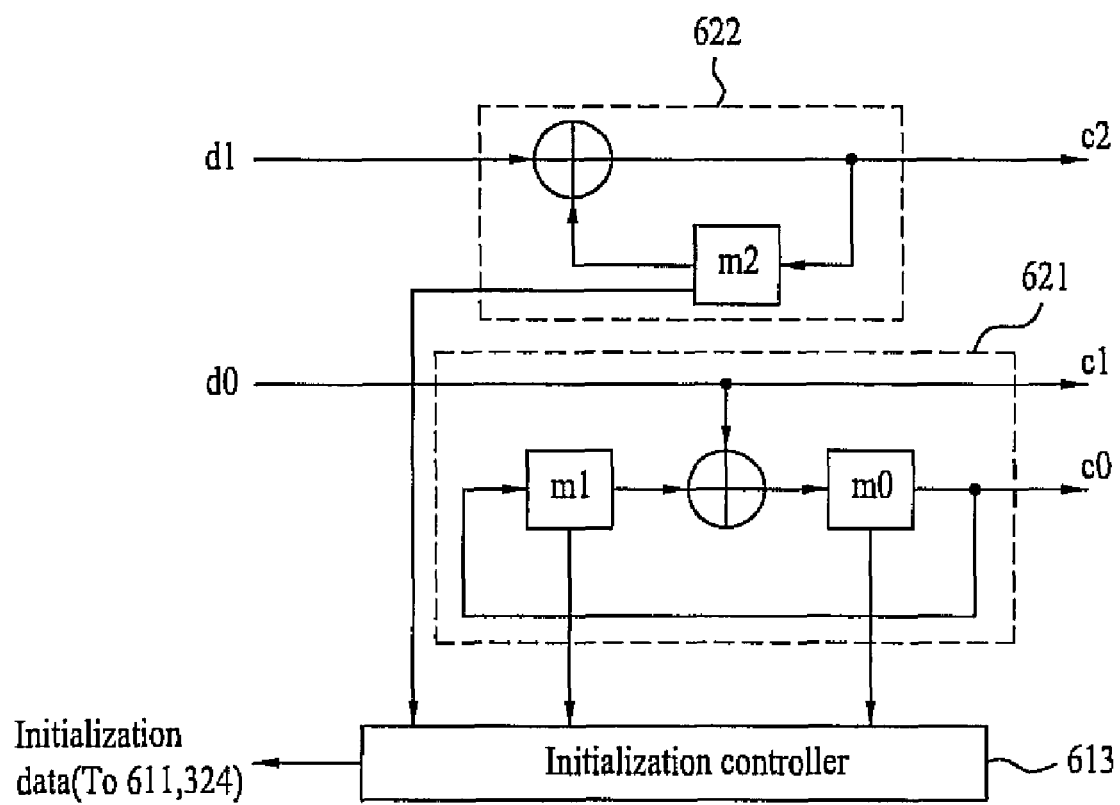
FIG. 11 illustrates a detailed block view of an example of a trellis encoder shown in FIG. 10.

FIG. 11 illustrates a detailed block view of an example of the trellis encoder 612 shown in FIG. 10. Herein, the trellis encoder 612 receives 2 input bits (d1, d0). Then, after coding (or encoding) the 2 input bits (d1, d0), the trellis encoder 612 outputs 3 bits (c2, c1, c0). Accordingly, the trellis encoder 612 includes a trellis coded modulation (TCM) encoder 621, and a pre-coder 622. Herein, the lower bit d0 of the input symbol is inputted to the TCM encoder 621, and the upper bit d1 of the input symbol is inputted to the pre-coder 622. The TCM encoder 621 includes a line bypassing the input bit d0 to a second output bit c1, a memory m1 temporarily storing and outputting a first output bit C0 that is fed-back, an adder adding the input bit d0 to the memory m1 and outputting the added bit, and a memory m0 temporarily storing the bit outputted from the adder and outputting the bit as a first output bit C0 and feeding-back the output bit to the memory m1.

The pre-coder 622 includes an adder, and a memory m2. The adder adds the input bit d1 to the signal that is fed-back and outputting the input bit-added signal as a third output signal c2. And, the memory m2 temporarily stores the third output signal c2 that is outputted from the adder and feeds-back the adder. At this point, each memory (i.e., m0 to m2) is provided with the same clock and operated in synchronization with the clocks In the structure shown in FIG. 11, the lower bit do is directly outputted as the second output bit c1. Simultaneously, the lower bit do is trellis-encoded by the two memories m0 and m1 and the adder of the TCM encoder 621, so as to be outputted as the first output bit c0. The upper bit d1 is pre-coded by the adder and the memory m2 of the pre-coder 622, so as to be outputted as the third bit c2. Therefore, the state of the memory m2 of the trellis encoder 612 is determined only by the upper bit d1, and the state for each of the memories m1 and m0 is determined only by the lower bit d0.

As shown in FIG. 11, only one d1 bit is required for initializing the memory m2 of the trellis encoder 612 to a predetermined value, and two d0 bits are required for initializing the memory m1 and m0 of the trellis encoder 612 to a predetermined value. Therefore, in order to initialize the memories m2, m1, and m0 of the trellis encoder 612, at least 2 input symbols are required.

Table 1 shown below describes the input of two symbols required for initializing the memory from an arbitrary m2$m1m0$ state to a 000 state.

TABLE 1

| m2m1m0 | 1st d1d0/2nd d1d0 |
|---|---|
| 0 0 0 | 00/00 or 10/10 |
| 0 0 1 | 00/01 or 10/11 |
| 0 1 0 | 01/00 or 11/10 |
| 0 1 1 | 01/01 or 11/11 |
| 1 0 0 | 00/10 or 10/00 |
| 1 0 1 | 00/11 or 10/01 |
| 1 1 0 | 01/10 or 11/00 |
| 1 1 1 | 01/11 or 11/01 |

Herein, for example, when the state is m2m1m0=111, in order to initialize the status 111 to 000, the d1d0 input symbol should be consecutively inputted as 01, 11 or as 11, 01.

Accordingly, the initialization controller 613 receives the state value of the memory m2m1m0 in the trellis encoder. Thereafter, the initialization controller 613 creates (or generates) an input symbol sequence required for the initialization by referring to Table 1 and outputs the input symbol sequence to the multiplexer 611. More specifically, when initialization of the memory is required, the initialization controller 613 verifies the state of the memory m2m1m0 and refers to Table 1, so as to generate (or create) and output the initialization data bits to the multiplexer 611. At this point, 12 trellis encoders are included in the VSB transmitting system. Further, since 2 symbols are required for initializing the memory of each trellis encoder, a total of 24 input symbols are first used for initializing when the known data sequence begins. Conversely, it can be easily estimated that when the state to which the memory is to be initialized is not 000, two other symbol sequences different from the ones shown in Table 1 are required. Therefore, a detailed description of the same will be omitted for simplicity.

The initialization controller 613 outputs the initialization data bits to the backward-compatibility processor 324. More specifically, since the memory is initialized by a new set of data and not by the interleaved data, the RS parity should be newly created and replaced with the original (or initial) parity data. This operation is performed by the backward-compatibility processor 324. Herein, the backward-compatibility processor 324 receives the output of the RS encoder 321 and the output of the initialization controller 613 within the trellis encoding unit 323, thereby creating a 20-byte parity and outputting the created parity to the multiplexer 611. The output of the trellis encoding unit 323 is outputted to the frame multiplexer 325. Thereafter, the frame multiplexer 325 inserts field and segment synchronization signals to the output data of the trellis encoding unit 323, which are then transmitted through the transmitter 330.

Figure 12:
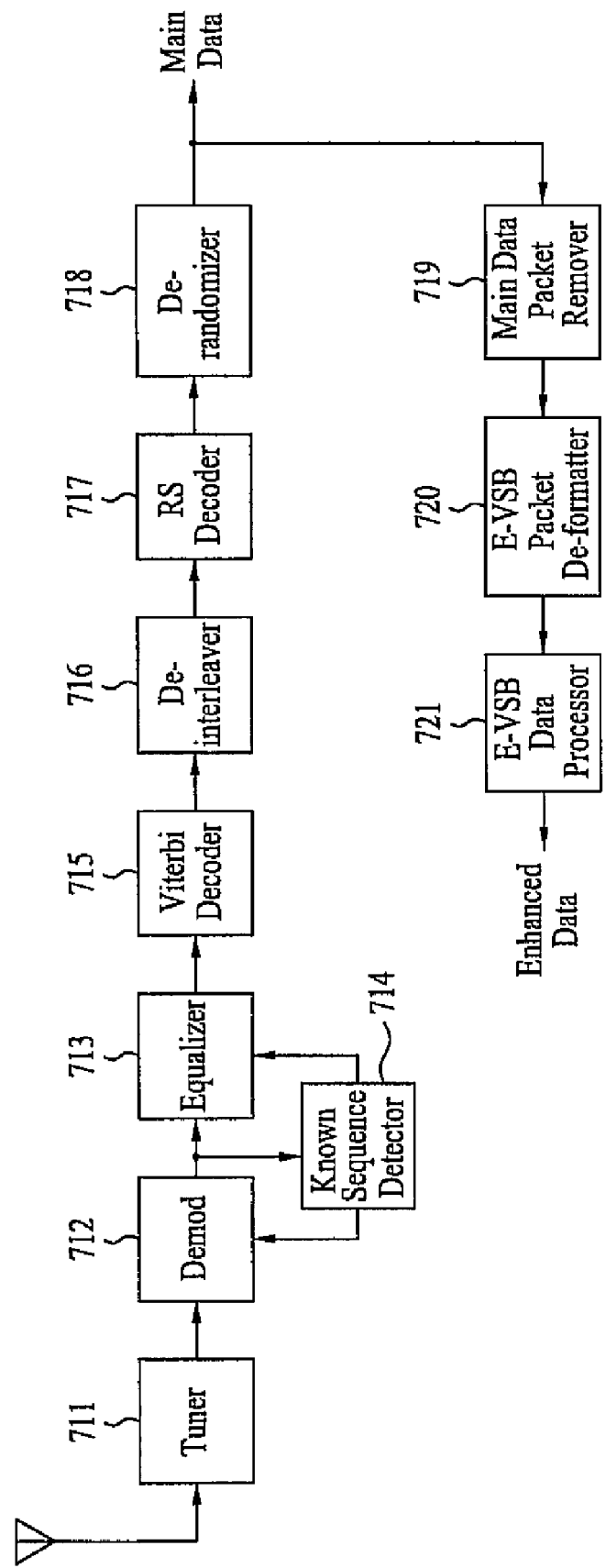
FIG. 12 illustrates a block view showing an overall structure of the digital television receiver according to an embodiment of the present invention.

FIG. 12 illustrates a block view showing an overall structure of the digital television receiver according to an embodiment of the present invention. More specifically, FIG. 12 illustrates an example of a VSB receiving system that receives data transmitted from the VSB transmitting system, shown in FIG. 3, and that demodulates and equalizes the received data so as to restore the transmitted data. The VSB receiving system includes a tuner 711, a demodulator 712, an equalizer 713, a known data (or sequence) detector 714, a Viterbi decoder 715, a deinterleaver 716, a Reed-Solomon (RS) decoder 717, and a derandomizer 718. The VSB receiving system also includes a main packet remover 719, a E-VSB packet deformatter 720, and an E-VSB data processor 721.

The tuner 711 tunes the frequency of a particular channel. Subsequently, the tuner 711 down-converts the tuned frequency and outputs the tuned channel frequency to the demodulator 712. The demodulator 712 performs carrier wave restoration and timing restoration of the tuned channel frequency wave, and outputs the processed channel frequency wave to the equalizer 713. The equalizer 713 performs compensation for any channel distortion included in the demodulated signal and outputs the compensated signal to the Viterbi decoder 715.

At this point, the known data detector 714 detects the known data, which have been inserted by the transmitting end, from the output data of the demodulator 712. Then, the known data detector 714 outputs the detected known data to the demodulator 712 and the equalizer 713. When the demodulator 712 uses the known data during the timing recovery or the carrier recovery, the demodulating performance may be enhanced. Similarly, when the equalizer 713 uses the known data for the channel equalization, the equalization performance may be enhanced.

The output of the equalizer 713 passes through the Viterbi decoder 715, the deinterleaver 716, the RS decoder 717, and the derandomizer 718. Thereafter, the output data is outputted to a main MPEG decoder (not shown) and simultaneously outputted to the main packet remover 719. The Viterbi decoder 715 Viterbi decodes the data outputted from the equalizer 713 and converts the Viterbi decoded data to bytes. Thereafter, the converted data are outputted to the deinterleaver 716. The deinterleaver 716 performs an inverse process of the data interleaver of the DTV transmitter and outputs the deinterleaved data to the RS decoder 717. The RS decoder 717 decodes the output of the deinterleaver 716 and removes the parity data from the input data and outputs the parity-removed data to the derandomizer 718.

The derandomizer 718 performs an inverse process of the randomizer of the DTV transmitter on the output of the RS decoder 717. Thereafter, the derandomizer 718 inserts the MPEG synchronization byte in the beginning of each packet, thereby outputting the data in 188-byte packet units. The output of the derandomizer 718 is simultaneously outputted to the main MPEG decoder (not shown) and to the main data packet remover 719. Herein, the main MPEG decoder only decodes the packet(s) corresponding to the main MPEG. If the packet ID is a null packet ID or a reserved packet ID, which was used for the enhanced data packet, the main MPEG decoder does not perform the decoding process.

In the meantime, the main data packet remover 719 removes the 188-byte unit main data packet from the data outputted from the derandomizer 718 and outputs the processed data to the E-VSB packet deformatter 720. Subsequently, the E-VSB packet deformatter 720 removes (or deletes) the 4-byte MPEG header and the known data place holder byte (or the known data byte) from the 188-byte packet outputted from the main data packet remover 719. Thereafter, the E-VSB packet deformatter 720 outputs the processed data to the E-VSB data processor 721. The E-VSB data processor 721 performs an inverse process of the E-VSB pre-processor 301 of the transmitting system, so as to process the data outputted from the E-VSB packet deformatter 720. Subsequently, the E-VSB data processor 721 outputs the final output data.

As described above, the digital television (DTV) transmitter and the method of coding data in the DTV transmitter according to the present invention have the following advantages. More specifically, the DTV transmitter/receiver is highly protected against (or resistant to) any error that may occur when transmitting additional data through a channel, and the DTV transmitter/receiver is also highly compatible to the conventional VSB system. The present invention may also receive the additional data without any error even in channels having severe ghost effect and noise. Additionally, by inserting known data in a specific area of the data area and transmitting the processed data, the receiving performance of the DTV receiver liable to a frequent change in channel may be enhanced. Finally, the present invention is even more effective when applied to mobile and portable receivers, which are also liable to a frequent change in channel and which require protection (or resistance) against intense noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital broadcasting transmitter comprising:
 a packet formatter for generating enhanced data packets including enhanced data and a known data sequence;
 a Reed-Solomon (RS) encoder for RS-coding the enhanced data packets by adding first parity data;
 a data interleaver for interleaving data of the RS-coded enhanced data packets;
 a trellis encoding unit for trellis-encoding the interleaved data, wherein memories included in the trellis encoding unit are initialized by initialization data at a start of the known data sequence;
 a backward-compatibility processor for generating second parity data based on the initialization data and providing the second parity data to the trellis encoding unit; and
 a first multiplexer for multiplexing the trellis-encoded data with field and segment synchronization signals,
 wherein the trellis encoding unit comprises:
  a trellis encoder having at least one memory and trellis-encoding one input bit among symbols corresponding to the interleaved data at a coding rate of ½; and
  a pre-coder having at least one memory and pre-coding the other input bit among the symbols.

2. The digital broadcasting transmitter of claim 1, wherein the memories are initialized to obtain a desired known data sequence by inputting the known data sequence from the data interleaver.

3. The digital broadcasting transmitter of claim 1, wherein the initialization data required to initialize the memories are determined based on previous values of the memories.

4. The digital broadcasting transmitter of claim 1, wherein the trellis encoding unit further comprises:
 a second multiplexer for providing the initialization data to at least the trellis encoder or the pre-coder at the start of the known data sequence.

5. The digital broadcasting transmitter of claim 1, wherein the memories are set to zero according to the initialization data.

6. The digital broadcasting transmitter of claim 1, further comprising an encoder for coding the enhanced data for forward error correction (FEC).

7. The digital broadcasting transmitter of claim 1, further comprising:
 a pilot inserter for inserting a pilot signal into output data of the first multiplexer;
 a modulator for converting the data into which the pilot signal is inserted into an intermediate frequency (IF) signal; and
 a radio frequency (RF) converter for converting the IF signal to a radio frequency (RF) signal for transmission.

8. A method of processing digital broadcast data in a digital broadcasting transmitter, the method comprising:
 generating enhanced data packets including enhanced data and a known data sequence in a packet formatter;
 Reed-Solomon (RS)-coding the enhanced data packets by adding first parity data in an RS encoder;
 interleaving data of the RS-coded enhanced data packets in a data interleaver;
 trellis-encoding the interleaved data in a trellis encoding unit which includes a trellis encoder having at least one memory and a pre-coder having at least one memory, wherein the memories included in the trellis encoding unit are initialized by initialization data at a start of the known data sequence;
 generating second parity data based on the initialization data;
 providing the second parity data to the trellis encoding unit; and
 multiplexing the trellis-encoded data with field and segment synchronization signals in a first multiplexer,
 wherein trellis-encoding the interleaved data comprises:
  trellis-encoding one input bit among symbols corresponding to the interleaved data at a coding rate of ½ in the trellis encoder; and
  pre-coding the other input bit among the symbols in the pre-coder.

9. The method of claim 8, wherein the memories are initialized to obtain a desired known data sequence by inputting the known data sequence from the data interleaver.

10. The method of claim 8, wherein the initialization data required to initialize the memories are determined based on previous values of the memories.

11. The method of claim 8, wherein trellis-encoding the interleaved data further comprises providing the initialization data to at least the trellis encoder or the pre-coder at the start of the known data sequence in a second multiplexer.

12. The method of claim 8, wherein the memories are set to zero according to the initialization data.

13. The method of claim 8, further comprising coding the enhanced data for forward error correction (FEC).

14. The method of claim 8, further comprising:
 inserting a pilot signal into output data of the first multiplexer;
 converting the data into which the pilot signal is inserted into an intermediate frequency (IF) signal; and
 converting the IF signal into a radio frequency (RF) signal for transmission.

15. A digital broadcasting receiver for processing digital broadcast data transmitted from a digital broadcasting transmitter, the digital broadcasting receiver comprising:
 a tuner configured to receive the digital broadcast data including a first known data sequence and enhanced data;
 a known data detector configured to detect the first known data sequence from the received digital broadcast data; and
 an equalizer configured to compensate for channel distortion in the enhanced data in the received digital broadcast data based on the detected first known data sequence,
 wherein the received digital broadcast data are generated in the digital broadcasting transmitter by:
  generating enhanced data packets including original enhanced data and a second known data sequence in a packet formatter;
  Reed-Solomon (RS)-coding the enhanced data packets by adding first parity data in an RS encoder;
  interleaving data of the RS-coded enhanced data packets in a data interleaver;

trellis-encoding the interleaved data in a trellis encoding unit which includes a trellis encoder having at least one memory and a pre-coder having at least one memory, wherein the memories included in the trellis encoding unit are initialized by initialization data at a start of the second known data sequence;

generating second parity data based on the initialization data;

providing the second parity data to the trellis encoding unit; and multiplexing the trellis-encoded data with field and segment synchronization signals in a multiplexer, and wherein trellis-encoding the interleaved data comprises:

trellis-encoding one input bit bits among symbols corresponding to the interleaved data at a coding rate of ½ in the trellis encoder; and pre-coding the other input bit among the symbols in the pre-coder.

16. A method for processing digital broadcast data transmitted from a digital broadcasting transmitter in a digital broadcasting receiver, the method comprising:

receiving the digital broadcast data including a first known data sequence and enhanced data;

detecting the first known data sequence from the received digital broadcast data; and compensating for channel distortion in the enhanced data in the received digital broadcast data based on the detected first known data sequence, wherein the received digital broadcast data are generated in the digital broadcasting transmitter by:

generating enhanced data packets including original enhanced data and a second known data sequence in a packet formatter;

Reed-Solomon (RS)-coding the enhanced data packets by adding first parity data in an RS encoder:

interleaving data of the RS-coded enhanced data packets in a data interleaver:

trellis-encoding the interleaved data in a trellis encoding unit which includes a trellis encoder having at least one memory and a pre-coder having at least one memory, wherein the memories included in the trellis encoding unit are initialized by initialization data at a start of the second known data sequence;

generating second parity data based on the initialization data;

providing the second parity data to the trellis encoding unit; and multiplexing the trellis-encoded data with field and segment synchronization signals in a multiplexer, and wherein trellis-encoding the interleaved data comprises:

trellis-encoding one input bit among symbols corresponding to the interleaved data at a coding rate of ½ in the trellis encoder; and pre-coding the other input bit among the symbols in the pre-coder.

* * * * *